(12) United States Patent
Jackson

(10) Patent No.: US 8,479,865 B2
(45) Date of Patent: Jul. 9, 2013

(54) GOLF CART SAFETY APPARATUS

(76) Inventor: Vincent Edward Jackson, Mobile, AL (US)

(*) Notice: Subject to any disclaimer, the term of this patent is extended or adjusted under 35 U.S.C. 154(b) by 154 days.

(21) Appl. No.: 12/931,863

(22) Filed: Feb. 11, 2011

(65) Prior Publication Data

US 2012/0205177 A1 Aug. 16, 2012

(51) Int. Cl.
*B60L 3/02* (2006.01)

(52) U.S. Cl.
USPC .................. 180/273; 180/272; 180/271

(58) Field of Classification Search
USPC .................................................. 180/270–273
See application file for complete search history.

(56) References Cited

U.S. PATENT DOCUMENTS

| | | | | |
|---|---|---|---|---|
| 2,482,550 A | * | 9/1949 | Koertge et al. | 200/86 R |
| 3,263,777 A | * | 8/1966 | Robichon | 187/222 |
| 4,558,263 A | * | 12/1985 | Harris et al. | 318/139 |
| 5,341,894 A | * | 8/1994 | Van Gorder et al. | 180/271 |
| 6,504,117 B2 | * | 1/2003 | Overstreet | 200/86.5 |
| 6,845,829 B2 | * | 1/2005 | Hafendorfer | 180/6.48 |
| 7,195,096 B1 | * | 3/2007 | Mawhinney | 180/315 |
| 7,300,092 B2 | * | 11/2007 | Dunn | 296/70 |
| 7,944,215 B2 | * | 5/2011 | Howard et al. | 324/654 |
| 2005/0257977 A1 | * | 11/2005 | Kamiya | 180/171 |
| 2008/0283344 A1 | * | 11/2008 | Inoue et al. | 188/71.5 |

FOREIGN PATENT DOCUMENTS

DE 19504270 A1 * 8/1996

* cited by examiner

*Primary Examiner* — Paul N Dickson
*Assistant Examiner* — Darlene P Condra
(74) *Attorney, Agent, or Firm* — Paul E Schaafsma; NovusIP, LLC

(57) ABSTRACT

A golf cart safety apparatus in accordance with the principles of the present invention reduces the incidence of injured protruding limbs A safety pedal is provided that prevents the golf cart from operating unless engaged. The safety pedal comprises a hinge, a "kill switch", and a platform upon which an occupant's foot can rest. The hinge is secured to a floor of the golf cart and the platform. The "kill switch", which prevents the golf cart from operating unless depressed, is operably associated with the platform. Because the foot of the occupant must engage the safety pedal in order to disable the "kill switch", the occupant's leg must be properly positioned inside the golf cart. Thus, a golf cart safety apparatus in accordance with the principles of the present invention reduces the incidences of golf cart injuries.

4 Claims, 4 Drawing Sheets

GOLF CART SAFETY APPARATUS

FIELD OF THE INVENTION

The present invention relates to golf carts.

BACKGROUND OF THE INVENTION

The origin of golf is unclear. One theory traces the sport back to the Roman game of paganica, in which players used a bent stick to hit a stuffed leather ball. As the Romans conquered most of the continent during the first century B.C., this theory asserts that paganica spread throughout Europe and eventually evolved into the modern game of golf. Another theory cites chuiwan ("chui" means striking and "wan" means small ball), a Chinese game played between the $8^{th}$ and $14^{th}$ centuries, as the predecessor. A Ming Dynasty scroll dating back to 1368 titled "The Autumn Banquet" depicts a member of the Chinese Imperial court swinging what resembles a golf club at a small ball with the aim of sinking the small ball into a hole. However, it is recognized that the modern game of golf originated in Scotland, where the first written record of golf is James II's banning of the game in 1457 as an unwelcome distraction to learning archery.

The game of golf is, of course, played on a golf course. A golf course consists of a series of holes, each with a teeing area that is set off by markers showing the bounds of the tee area, a fairway, roughs and other hazards (such as sand traps), and a putting green. The putting green consists of short, well-groomed grass with a flagstick and cup. A standard round of golf consists of playing 18 holes, thus most golf courses have this number of holes; some, however, only have nine holes and the course can be played twice per round.

Golf courses are not small. Golf architect Tom Doak noted, "[t]o make a good course and practice facility, a minimum of about 150 acres is required." (Doak *The Anatomy of a Golf Course*, p. 14 (Burford Books January 1999)). Estimates of the distance walked in a typical round of 18 holes vary from 3-6 miles depending, of course, on the length of the course and the accuracy of the golfer. While such distance can be an excellent source of exercise for the healthy, this distance poses a barrier to those who suffer from disabilities which make walking this distance uncomfortable.

A solution for such golfers is the golf cart. A golf cart typically is a small, battery-powered, three- or four-wheel vehicle used for transporting one or two golfers and their equipment around a golf course. More recently, golf carts have become much faster and more powerful—some can reach 25 mph and travel over 40 miles on a single battery charge. In addition, golf carts are now routinely used for transportation purposes at hospitals, airports, national parks, college campuses, businesses, and military bases. In many gated and retirement communities, golf carts have become a primary means of transportation.

The use of such motorized vehicles on a casual basis has given rise to golf cart related injuries. From 1990 until 2006, the injury rate from golf cart use rose more than 130 percent. Watson et al. "Golf Cart-Related Injuries in the U.S." 35 American Journal of Preventive Medicine 55 (July 2008). The number of golf cart-related injuries increased steadily and significantly over Watson et al.'s study period, from an estimated 5772 cases in 1990 to an estimated 13,411 cases in 2006, an increase of 132%. (Id.) According to the Watson et al. study, one of the main causes of golf cart injury is injury to a protruding limb. (Id. at 56.) Thus, what would be helpful in reducing the incidences of golf cart injury would be a safety apparatus that reduces the incidence of injured protruding limbs.

SUMMARY OF THE INVENTION

A golf cart safety apparatus in accordance with the principles of the present invention reduces the incidence of injured protruding limbs. A safety pedal is provided that prevents the golf cart from operating unless engaged. The safety pedal comprises a hinge, a "kill switch", and a platform upon which an occupant's foot can rest. The hinge is secured to a floor of the golf cart and the platform. The "kill switch", which prevents the golf cart from operating unless depressed, is operably associated with the platform. Because the foot of the occupant must engage the safety pedal in order to disable the "kill switch", the occupant's leg must be properly positioned inside the golf cart. Thus, a golf cart safety apparatus in accordance with the principles of the present invention reduces the incidences of golf cart injuries.

DETAILED DESCRIPTION OF THE INVENTION

Figure 1:
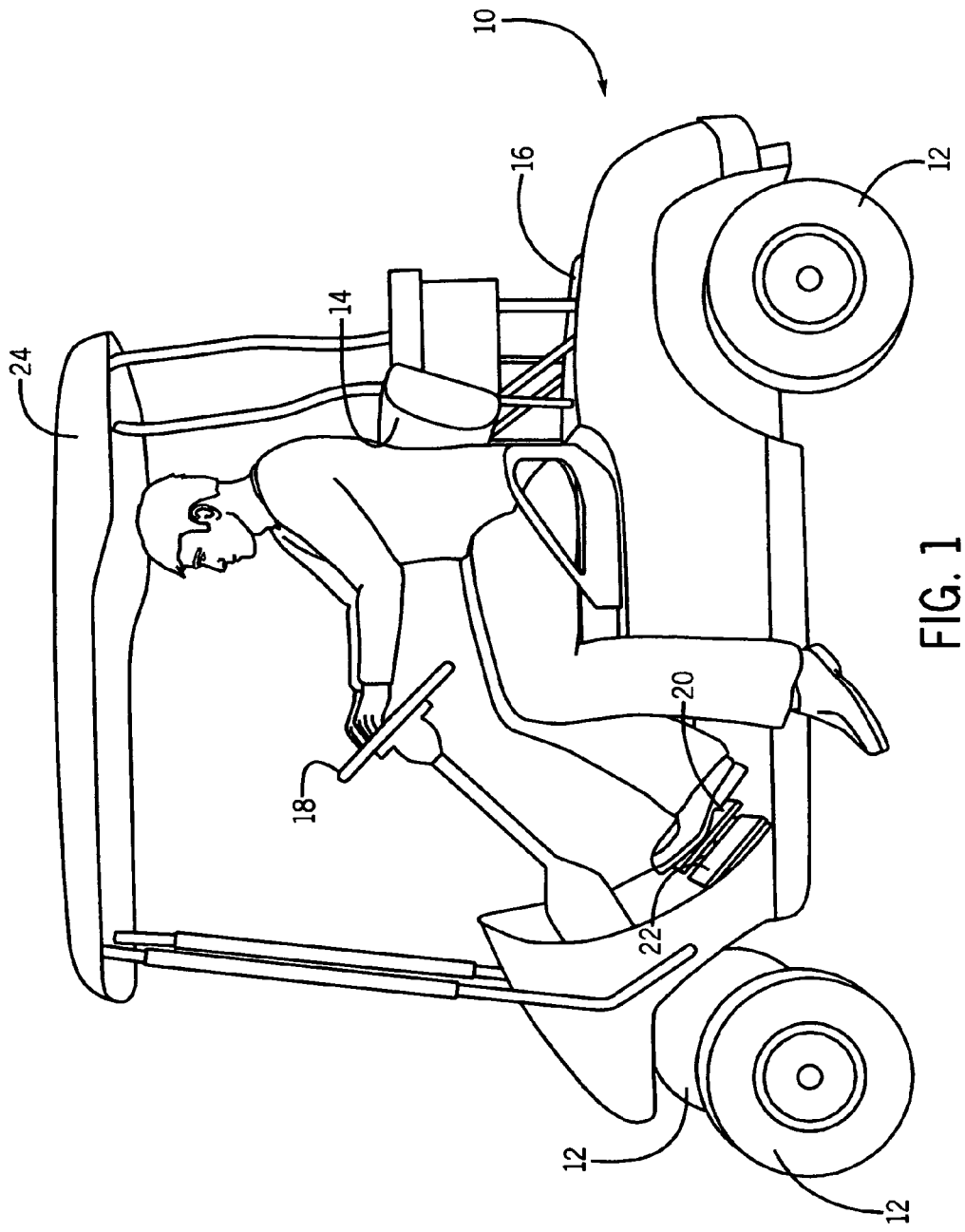
FIG. 1 shows a side-elevation view of an example prior-art golf cart with an occupant's leg dangerously protruding outside of the golf cart.

In accordance with the principles of the present invention, a golf cart safety apparatus is provided that reduces the incidences of golf cart injury. Referring first to FIG. 1, a side-elevation view of an example prior-art golf cart 10 is seen. This example golf cart 10 includes four wheels 12 (the fourth not seen) to provide mobility to the golf cart. A seating area 14 is provided, which typically can accommodate two occupants. A storage area 16 is provided, adopted to receive golf equipment such as a golf bags or other stored items. A steering wheel 18 is provided, and an accelerator 20 and a brake 22 are provided to control the golf cart. Optionally, a canopy 24 can be provided to shade the occupants from the elements.

As previously mentioned, from 1990 until 2006 the injury rate from golf cart use rose more than 130 percent. Watson et al. "Golf Cart-Related Injuries in the U.S." 35 American Journal of Preventive Medicine 55 (July 2008). According to the Watson et al. study, one of the main causes of golf cart injury is injury to a protruding limb. (Id. at 56.) Because the typical golf cart does not employ doors, a major occurrence of protruding limbs is the temptation of occupants to simply dangle their outside leg outside the golf cart, as depicted in FIG. 1. This can be particularly dangerous as such a protruded leg is susceptible to low lying obstacles that are unseen from the perspective of the driver, such as for example street curbs, irrigation equipment, fire hydrants, etc.

Figure 2:
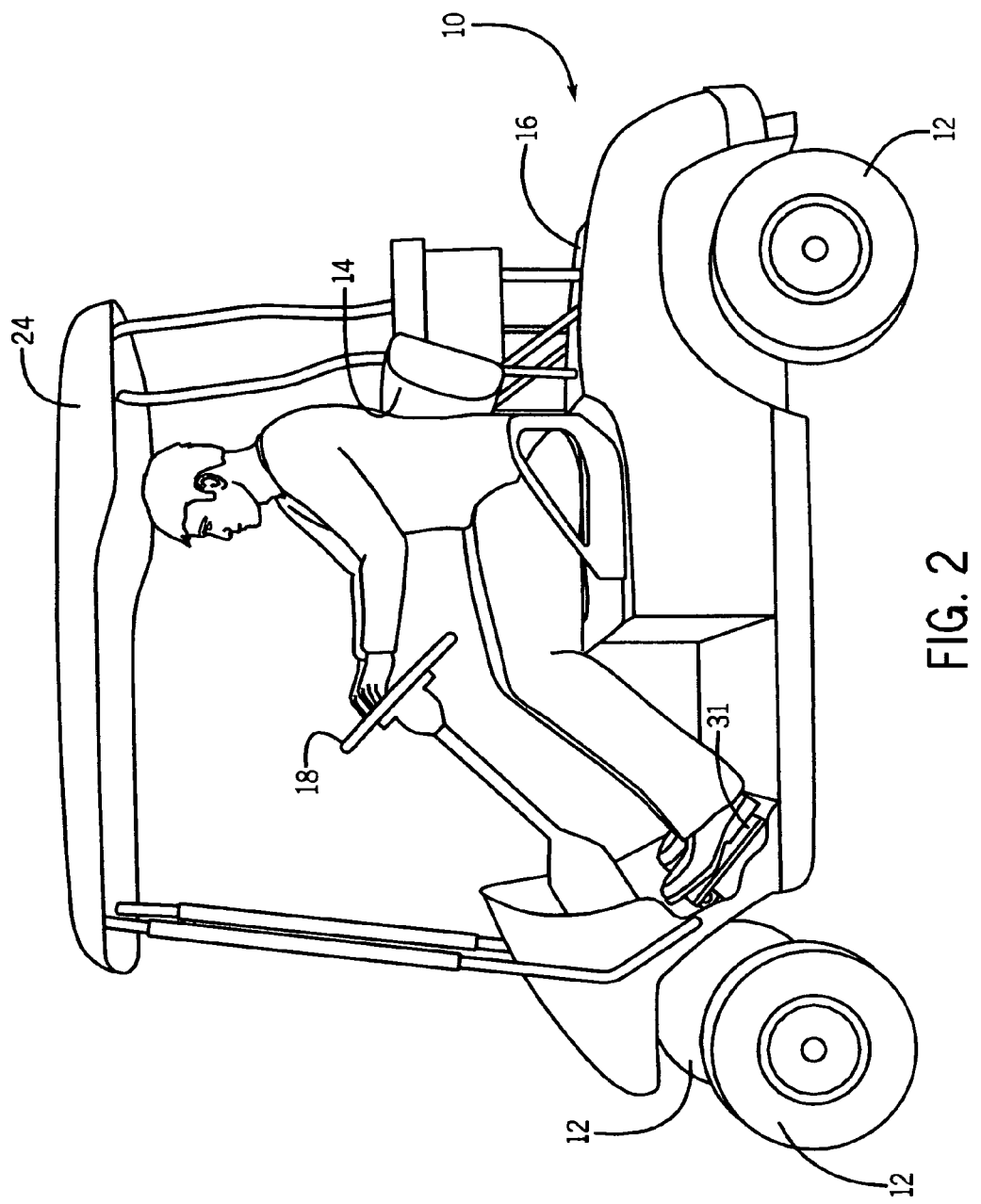
FIG. 2 shows a side-elevation view of a golf cart having a golf cart safety apparatus in accordance with the principles of the present invention with the occupant's leg properly positioned safely inside the golf cart.

FIG. 2 shows a side-elevation view of a golf cart having a golf cart safety apparatus in accordance with the principles of the present invention with the occupant's leg properly positioned safely inside the golf cart. As with the example prior art golf cart of FIG. 1, this golf cart 10 includes four wheels 12 (the fourth not seen) to provide mobility to the golf cart. A seating area 14 and a storage area 16 are provided. A steering wheel 18 is provided to steer the golf cart. An accelerator 20 and a brake 22 (not seen) are provided to control the golf cart. Optionally, a canopy 24 can be provided to shade the occupants from the elements.

Figure 3:
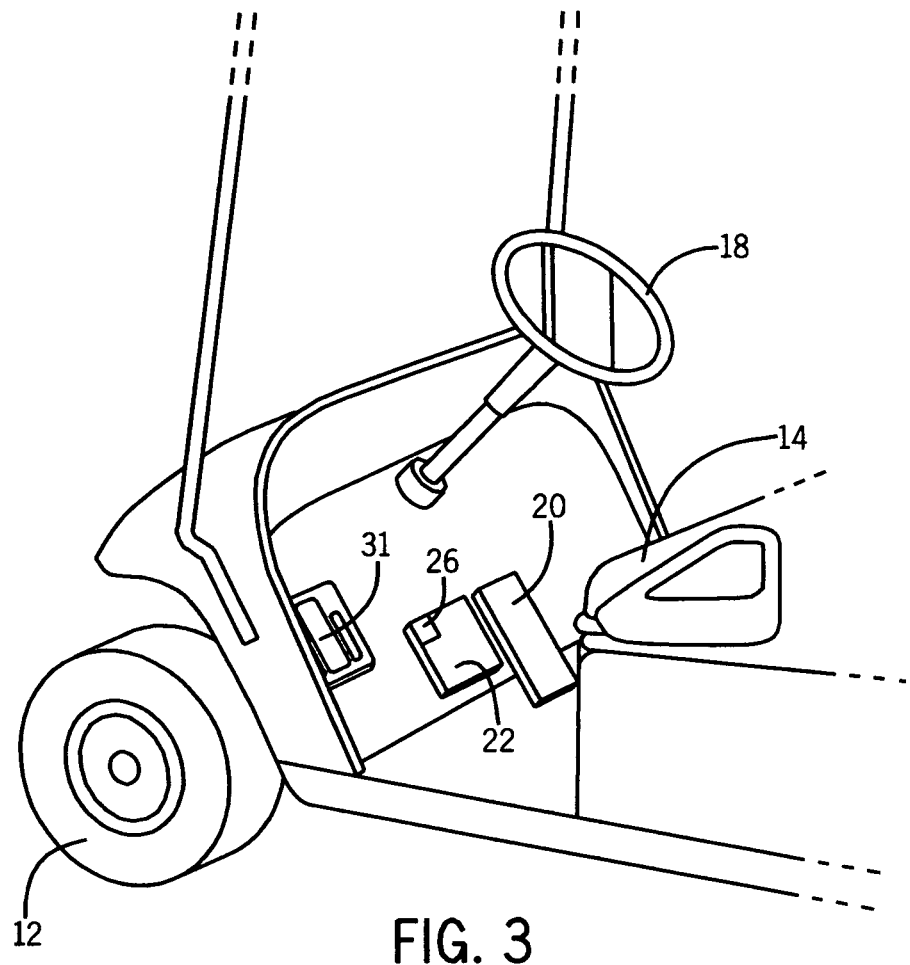
FIG. 3 shows a perspective view of the golf cart of FIG. 2 without an occupant.

When using a golf cart having a golf cart safety apparatus in accordance with the principles of the present invention, the occupant's leg must be properly positioned inside the golf cart. Referring now to FIG. 3, a perspective view of a golf cart having a golf cart safety apparatus in accordance with the principles of the present invention is seen. Wheels 12, a seating area 14, a steering wheel 18, an accelerator 20, and a brake 22 are seen. The brake 22 typically includes a lock 26 that can be engaged to park or lock the golf cart in position. In addition, a golf cart safety apparatus in accordance with the principles of the present invention comprises a safety pedal 31. The safety pedal 31 must be engaged with the occupant's foot in order for the golf cart to be allowed to move. Thus, by incorporating a golf cart safety apparatus in accordance with the principles of the present invention the occupant's leg must be properly positioned safely inside the golf cart, thereby reducing the incidences of golf cart injury.

Figure 4:
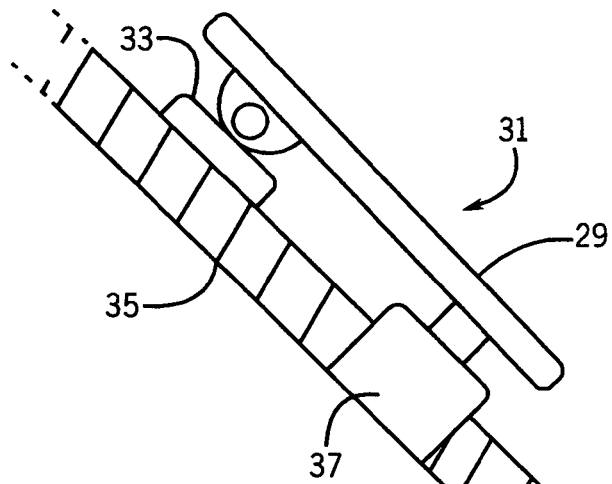
FIG. 4 shows a side-elevation, detailed view of the golf cart of FIG. 2 without an occupant showing a golf cart safety apparatus in accordance with the principles of the present invention.
Figure 5:
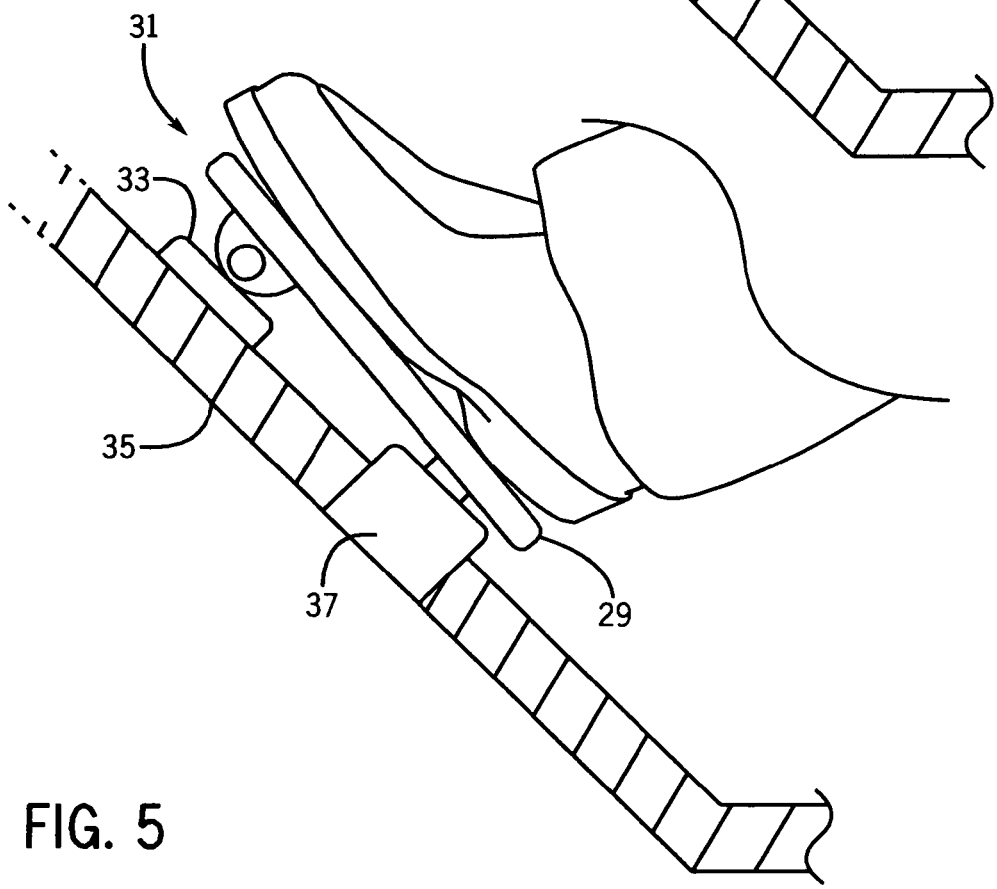
FIG. 5 shows a side-elevation, detailed view of the golf cart of FIG. 2 with an occupant showing the use of a golf cart safety apparatus in accordance with the principles of the present invention.

In more detail, FIG. 4 shows a side-elevation, detailed view of the safety pedal 31 without an occupant. While various particular structures can be utilized to engage with the occupant's foot in order for the golf cart to be allowed to move, the example safety pedal 31 depicted in FIG. 4 comprises a platform 29, a hinge 33, and a "kill switch" 37. The hinge 33 is secured to the floor 35 of the golf cart 10 and the platform 29. The "kill switch" 37, which in the non-engaged position ensures the golf cart's motor does not run, is likewise secured to the floor 35 of the golf cart 10. The hinge 33 can be positioned at the upper periphery of the platform 29 and the "kill switch" 37 can be secured at the lower periphery of the platform 29, such that the occupant's foot can engage the safety pedal 31 by simply resting on it, as seen in FIG. 5.

Figure 6:
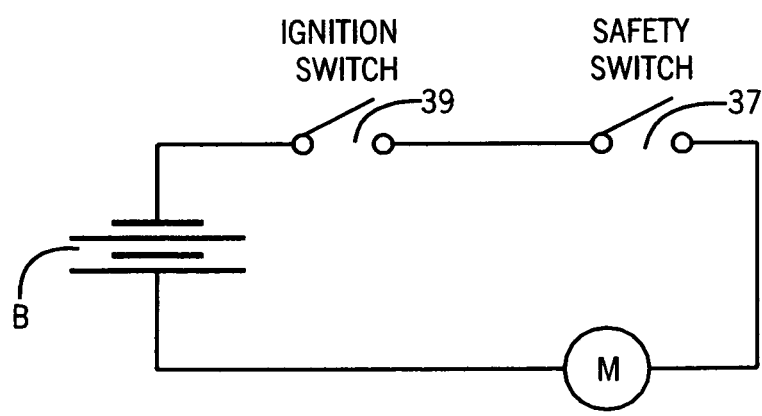
FIG. 6 is a circuit diagram of a golf cart safety apparatus in accordance with the principles of the present invention.

Referring to FIG. 6, a circuit diagram of a golf cart safety apparatus in accordance with the principles of the present invention is seen. The golf cart motor (M) is connected to a battery (b) via the "kill switch" 37 and a standard ignition switch 39; thus, for the motor to engage both the ignition switch 39 and the "kill switch" 37 must be enabled.

While the invention has been described with specific embodiments, other alternatives, modifications and variations will be apparent to those skilled in the art. For example, while in the presently described example of a golf cart safety apparatus a single safety pedal is depicted, an optional passenger safety pedal could be provided that could be overridden (for example, by the attendant renting the golf cart) if a single occupant was renting the golf cart. Accordingly, it will be intended to include such alternatives, modifications and variations within the spirit and scope of the appended claims.

What is claimed is:

1. A golf cart comprising:
   a plurality of wheels to provide mobility to the golf cart;
   a seating area;
   a steering wheel to steer the golf cart;
   an accelerator and a brake to control the golf cart; and
   a platform, a hinge secured to a floor of the golf cart and the platform, the hinge secured to a floor of the golf cart at or about one upper periphery of the platform, and a switch operably associated with the platform, the switch secured to the floor of the golf cart at or about another periphery of the platform, the switch preventing the golf cart from operating unless engaged.

2. The golf cart of claim 1 further including a canopy to shade the occupants from the elements.

3. The golf cart of claim 1 further including a storage area adopted to receive equipment such as a golf bag or other stored items.

4. A safety apparatus adapted to be installed in a golf cart, comprising:
   a pedal that prevents the golf cart from operating unless engaged;
   the pedal comprising a platform, a hinge adapted to be secured to a floor of the golf cart at or about an upper periphery of the platform, and a switch operably associated with the platform, the switch adapted to be connected to the golf cart at or about a lower periphery of the platform such that the safety apparatus prevents the golf cart from operating unless depressed

* * * * *